US007878155B2

(12) United States Patent
Winestock

(10) Patent No.: US 7,878,155 B2
(45) Date of Patent: Feb. 1, 2011

(54) PET COLLAR

(76) Inventor: Nancy Winestock, 3233 Lake Ave., Unit 15C, Suite 129, Wilmette, IL (US) 60091

(*) Notice: Subject to any disclaimer, the term of this patent is extended or adjusted under 35 U.S.C. 154(b) by 0 days.

(21) Appl. No.: 12/756,011

(22) Filed: Apr. 7, 2010

(65) Prior Publication Data

US 2010/0192871 A1 Aug. 5, 2010

Related U.S. Application Data

(63) Continuation of application No. 11/707,249, filed on Feb. 13, 2007, now Pat. No. 7,743,736.

(60) Provisional application No. 60/772,719, filed on Feb. 13, 2006.

(51) Int. Cl.
*A01K 27/00* (2006.01)

(52) U.S. Cl. .................. 119/815; 119/814; 119/821

(58) Field of Classification Search ............... 119/814, 119/815, 821, 850, 855, 856, 857, 863, 865, 119/858; 54/67; D30/152; 602/18, 60, 61
See application file for complete search history.

(56) References Cited

U.S. PATENT DOCUMENTS

| 4,233,942 A | * | 11/1980 | Williams | 119/814 |
| 4,598,666 A | * | 7/1986 | Spanko | 119/855 |
| 4,719,876 A | * | 1/1988 | Wilken | 119/815 |
| 5,012,764 A | * | 5/1991 | Fick et al. | 119/821 |
| 5,307,764 A | * | 5/1994 | Moy | 119/815 |
| 5,469,814 A | * | 11/1995 | Moy et al. | 119/815 |
| 5,540,189 A | * | 7/1996 | Masson | 119/850 |
| 5,628,283 A | * | 5/1997 | Huegelmeyer | 119/815 |
| 5,778,828 A | * | 7/1998 | Klinkhart et al. | 119/815 |
| 5,915,337 A | * | 6/1999 | Klinkhart et al. | 119/815 |
| 6,129,054 A | * | 10/2000 | Campbell | 119/856 |
| 6,532,904 B1 | * | 3/2003 | Bowen | 119/865 |
| 2002/0108586 A1 | * | 8/2002 | Martin | 119/850 |
| 2009/0178628 A1 | * | 7/2009 | Carmean et al. | 119/850 |

* cited by examiner

*Primary Examiner*—T. Nguyen
(74) *Attorney, Agent, or Firm*—Factor & Lake, Ltd.

(57) ABSTRACT

This invention relates to a collar device that limits the head movement for a canine or feline pet while the pet is recuperating from surgery or injury. The collar may be fitted with removable ear guards. The collar is capable of being coupled to a leash so the animal can be taken on a walk with the protective collar in an operative position.

7 Claims, 9 Drawing Sheets

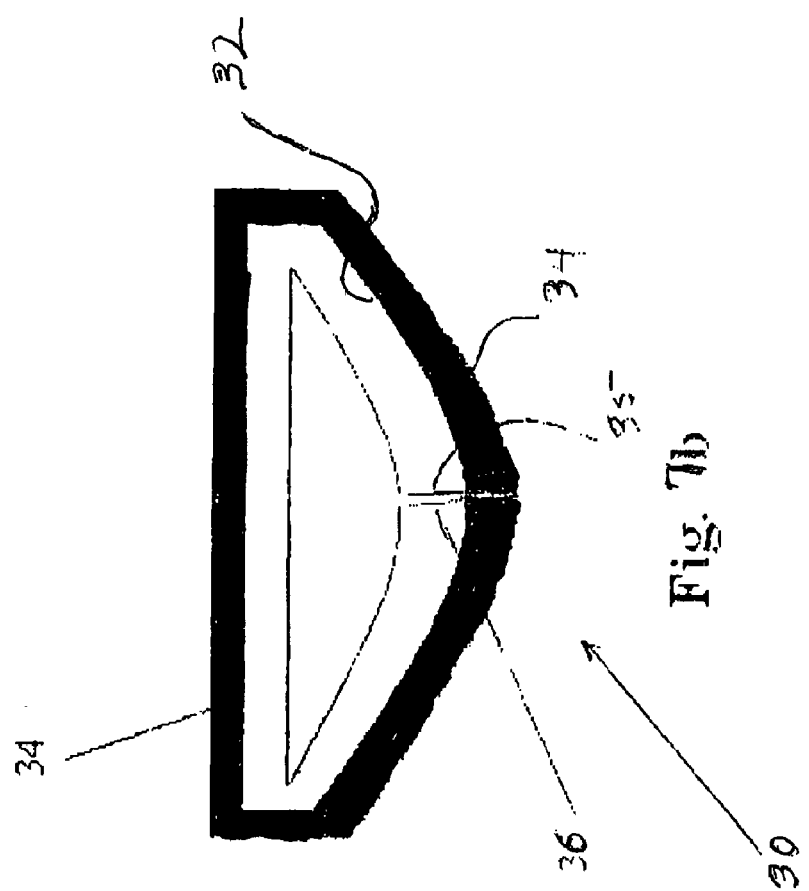
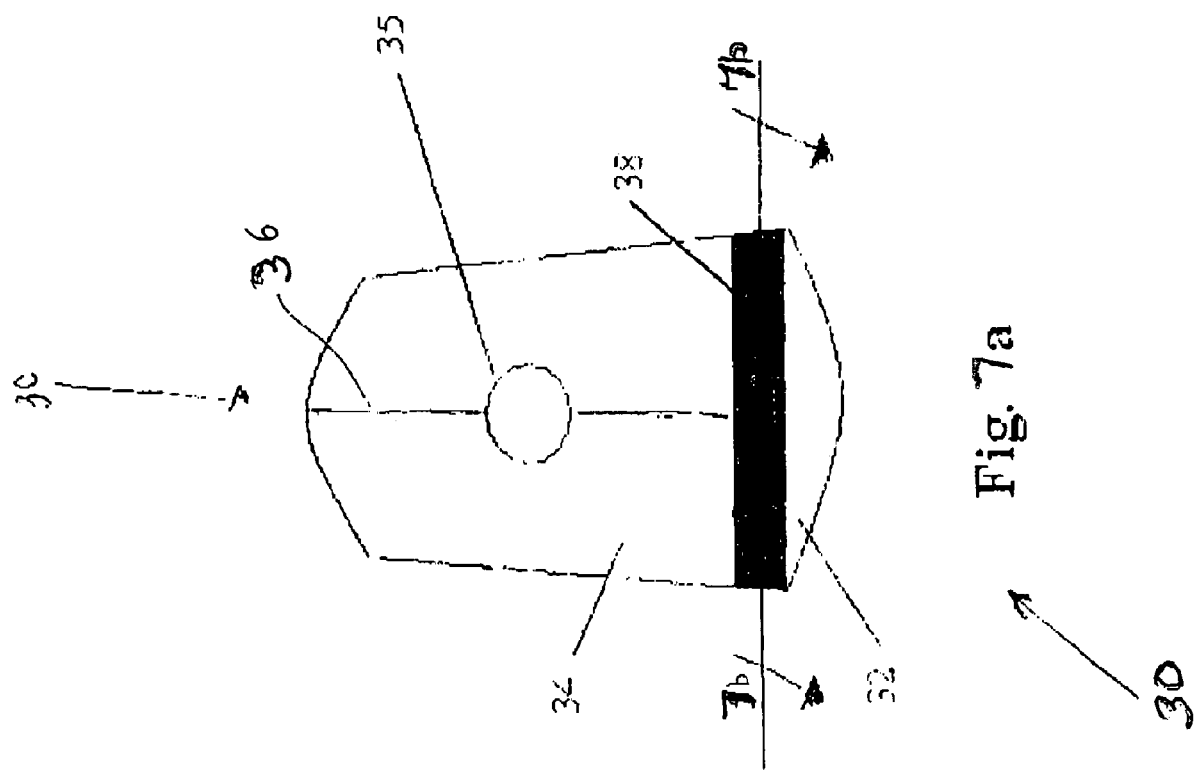

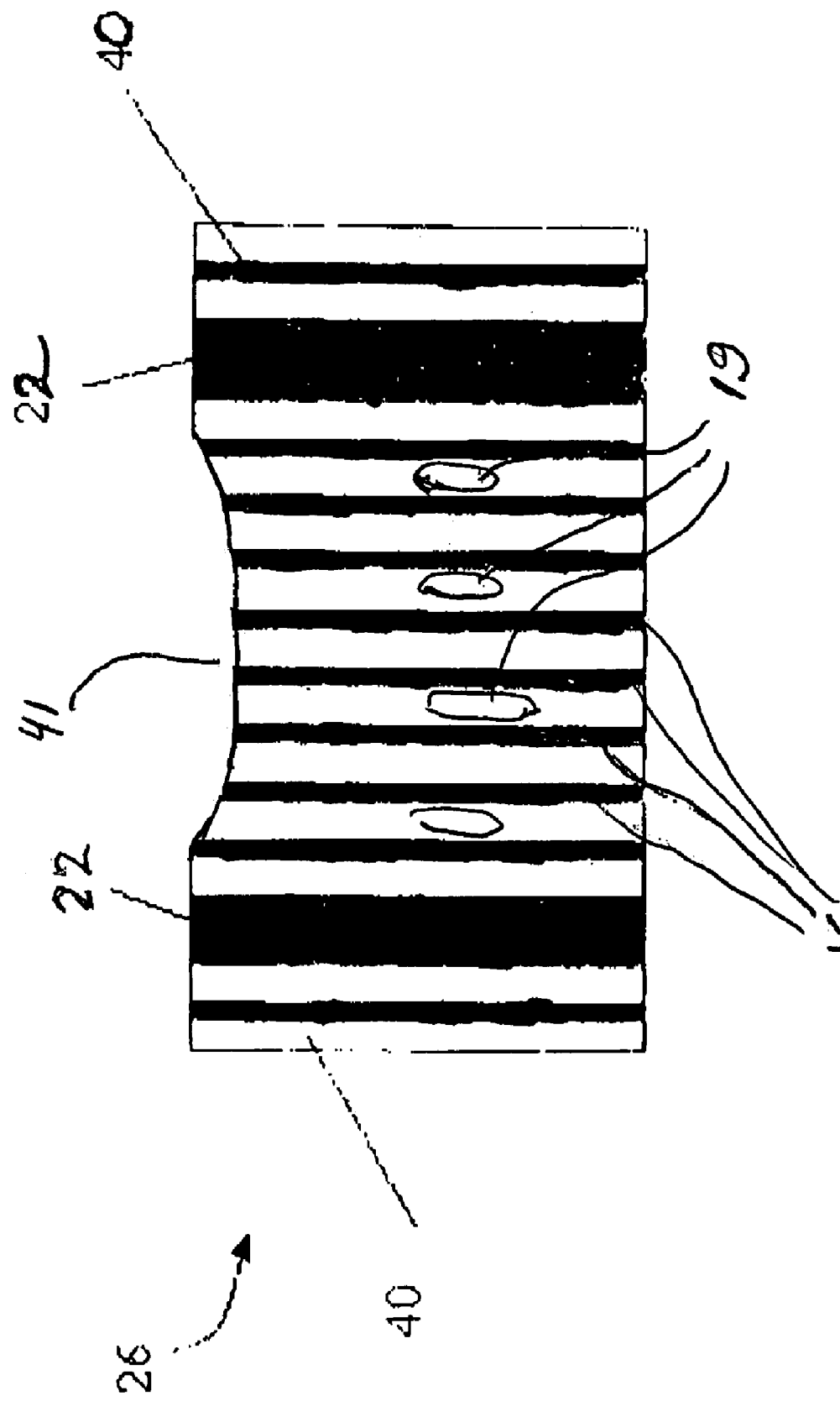

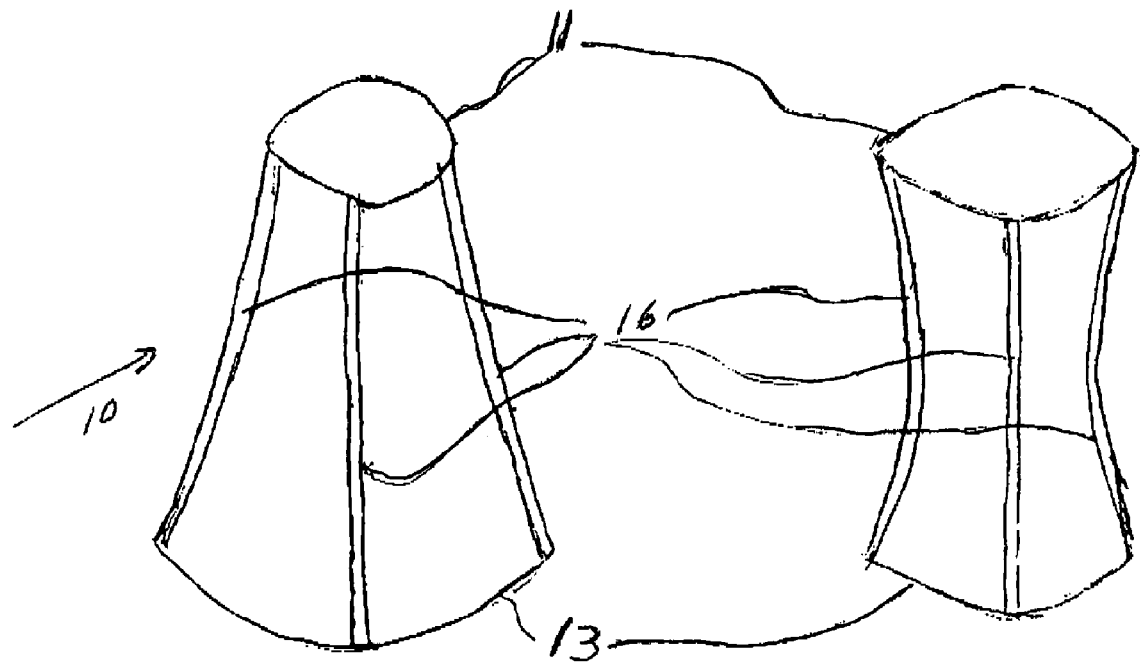
Fig. 10a                    Fig. 10b
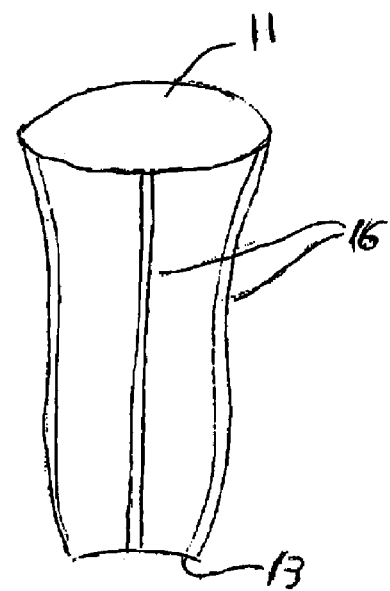
Fig. 10c

PET COLLAR

CROSS-REFERENCE TO RELATED APPLICATIONS

This application is a continuation of U.S. patent application Ser. No. 11/707,249 filed on Feb. 13, 2007 which claims the benefit of U.S. Provisional Application No. 60/772,719 filed Feb. 13, 2006, both of which are incorporated herein by reference.

BACKGROUND OF THE INVENTION

1. Field of the Invention

This invention relates to a collar device that limits an injured pet's access to portions of its head and body during convalescence. More specifically, this invention relates to a collar which prevents a pet from clawing its head with its paws, while also limiting access of its mouth to the rest of its body.

2. Description of the Prior Art

Canines and felines often undergo surgeries or sustain injuries. The sites of such surgeries or injuries are manifold. In addition, there are specifically targeted surgical sites. For example, for select breeds of dogs such as Boxers, Great Danes, Doberman Pincers, Miniature Pincers, Schnauzers, Bouviers des Flandres, and American Pit Bull Terriers, a surgical procedure (ear cropping) is performed on the dog so that the ears will stand erect on the dog's head to a point, instead of having the ears flop down on the head. Oftentimes the ears require constant bandaging and support via a splint to facilitate up-right positioning of the ears. During this process, the dog may become agitated and attempt to scratch its ears. This tendency to scratch the wound site has prompted protective devices to appear on the market.

To prevent an animal from licking or biting an area on its body or scratching its head, a plastic frusto-conical shaped collar, such as an Elizabethan collar (U.S. Pat. No. 3,036,554 issued May 29, 1962 to F. L. Johnson), often is fitted around the neck of an animal. This collar extends radially from the head and restricts movement of the neck. The cone protrusion prevents the pet from contacting its body or legs with its mouth and head and thus prevents the pet from scratching and licking a wound.

While the cone may prevent a pet from reaching an affected area, it is disadvantageous as it restricts the pet's line of sight and constitutes an encumbrance to the pet. For example, with an Elizabethan collar, a pet cannot lie comfortably in a reposed position as the Elizabethan collar prevents the head from lying flat on the floor.

A variation of the Elizabethan collar, currently marketed as the Trimline Recovery Collar, differs from the basic Elizabethan collar design by employing softer materials in its construction, thereby affording the animal some increase in comfort. However, it still restricts the pet's line of sight.

Another recovery collar is the Soft E-Collar. It is a variation of the Elizabethan collar wherein the conical shape is replaced by a shorter, more doughnut-shaped collar. While this widens the pet's field of vision somewhat, its placement on the animal does not appear to be secure except, perhaps, in those instances where the pet happens to also wear a regular collar and where the Soft E-Collar is securely attached to the pet's regular collar. Also, the Soft E-Collar provides little protection to the pet's ears in the event of surgery or trauma in that area of its body.

Another doughnut-shaped recovery collar available on the market is the Pro Collar. This collar is inflatable. As such, it can be more securely attached to the pet than the Soft E-Collar over a wide range of circumstances. However, its reliance on inflation represents a shortcoming, inasmuch as either the pet's own scratching or contact with a sharp or rough object may result in deflation of the collar and consequent exposure of the animal's wounds or other trauma sites to new dangers. Another recovery collar device is described in U.S. Pat. No. 5,469,814 issued Nov. 28, 1995, to Moy et al. This device avoids some of the shortcomings of the Elizabethan collar. However, its shape is that of a cylinder. Because of this cylindrical geometry, the device does not permit certain movements of the animal's head that would afford the animal greater comfort. Also it does not incorporate necessary restrictions to head movement. Finally, this invention fails to provide any protection for the ear or ears of an animal that has a wound, surgical or otherwise, in that region.

Thus, there is a need in the art for a device that facilitates comfortable, yet protective recuperation of an injured animal, including an animal with injured ears.

SUMMARY OF THE INVENTION

It is an object of the present invention to provide a pet collar that overcomes many of the disadvantages of the prior art. The present invention provides a means to walk an animal on a leash while it is fitted with a collar which isolates the head from the rest of the animal's body.

It is another object of the present invention to provide a collar that has high tensile strength allowing for the types of tension or deformation typically imposed by the movements of an animal that is wearing the device. A feature of the invention is that the collar incorporates a flexible (i.e. non-rigid) yet impact-resistant material, such as a plastic, as one of its layers, thus simultaneously providing both flexibility and protection from impact. This layer may also be ribbed, thus enhancing its flexibility and impact resistance. An advantage of the invention is that the material imparts a bias of the collar back to the head-forward configuration of the wearer such that the collar applies medially directed pressure to the animal's neck to prompt the animal to return its head to a forward looking orientation.

A further object of the present invention is to provide a collar that restricts side-to-side or up-and-down neck movement of an animal while still affording the animal some freedom of motion. A feature of the invention is a plurality of arc-shaped rigid plastic members positioned between an impact resistant outer shell and a reversibly deformable inner shell of the collar such that the edge of a distal edge of the device (i.e., the edge closest to the animal's head near the front of the neck) curves inwardly toward the longitudinal axis of the collar. Another feature of the invention is that a proximal edge (i.e., the edge closest to the animal's body and further from the head) does not curve away from the animal. In one embodiment, the proximal edge curves inwardly toward the animal's body when worn by the animal. An advantage of the intermediate layer is that the straight proximal edge induces a pressure point reflex when the animal attempts to move its head from side-to-side more than necessary for adequate peripheral vision.

It is yet another object of this invention to provide a collar which protects the ears of an animal. A feature of the invention is an outer shell that is adapted to reversibly but rigidly receive impact resistant ear guards. An advantage of this invention is that it immobilizes and protects the ears from the paws of the pet and from elements in the environment.

Yet a further object of the present invention is to provide a collar to confer comfort to a recuperating animal. A feature of this invention is that the collar has an interior shell lined with a soft fabric along its inner surface. Another feature is that one or more layers of soft material, such as foam, can be interposed between an impact resistant but flexible outer layer and the aforementioned soft liner. An advantage of the soft fabric and the foam is that they provide a medium contacting the pet's body which minimizes chafing of the skin of the animal.

Another object of the present invention is to provide a means of aeration of portions of the animal's body that are covered by the invented device. A feature of this invention is a plurality of openings that fully pass through all surfaces of the device, which openings are positioned at selected locations. An advantage of this invention is that fluid exchange with, and access to the animal's body surface residing under the collar is facilitated.

Yet another object of the present invention is to provide an adjustable pet collar. A feature of the collar is that it is fitted around the neck of an animal via a hook and pile closure means, such as Velcro.®. An advantage of this feature is that the collar fits an assortment of neck sizes and can be adjusted for a tight fit around a particular animal's neck. Another advantage of this feature is that the shape of the collar may be varied depending on the characteristics of the animal: the collar may be made to flare out near the head, to assume a cylindrical shape, to flare out at the shoulders, or to curve inwardly (i.e., toward the medial line of the collar) toward the animal's shoulders to provide a means to discourage or otherwise minimize yaw or side-to-side head motion of the animal.

An embodiment of this invention is a first material that provides the necessary combination of impact resistance and flexibility, a layer or sequence of layers underlying this first material, and a second material that overlies the first material. Typically this overlying second material is adapted to protect the impact resistant but flexible material from buffeting and exposure to the elements. Also, typically, this overlying second material provides a medium for the placement of attachments, such as a leash, identification tags, medicament pouches, and the like. An advantage of this invention is that it provides a device that combines flexibility and impact resistance.

Briefly, the invention provides a pet protection device adapted to be worn or otherwise received about the neck of the pet, comprising an outer shell having a first surface and second surface; an inner shell positioned parallel to and in close spatial relationship to said second surface; and a substrate defining a plurality of ribs and positioned intermediate said outer shell and said inner shell. A major advantage of this invention includes providing greater comfort to the animal and more freedom of motion for its head while still restricting the pet's access to healing sites on its body. A second advantage of this invention is that it offers, optionally, a means of protecting one or both of the pet's ears.

Also provided is a protective pet collar comprising a generally rectangular and flat construct a defining a forward edge and a rearward edge such that the construct is worn so that the forward edge is positioned in close spatial relationship to the head of the pet while the rearward edge is positioned remote from the head of the pet; a first portion of said first forward edge, which when the collar is worn, is positioned inferior to the animal's neck, the edge defining a region for allowing the pet to lower its head; and a second portion of the first forward edge, which when the collar is worn, said second portion is positioned superior to the animal's neck and adapted to removably receive ear guards.

BRIEF DESCRIPTION OF THE DRAWING

These and other objects and advantages of the present invention can be better understood from the accompanying drawing whereby:

FIG. 7a is a perspective elevation of an alternative embodiment of a single ear cover in accordance with features of the present invention;

FIG. 7b is a cross-section of the single ear cover taken along line 7b-7b of FIG. 7a in accordance with features of the present invention;

FIG. 9 is a top plan view of an embodiment of an intermediate layer of the collar in an undeployed flat position in accordance with features of the present invention;

FIG. 10a is a perspective elevation of an alternative embodiment of a collar in accordance with the features of the present invention; and FIG. 10b is a perspective elevation of an alternative embodiment of a collar in accordance with the features of the present invention;

FIG. 10c is a perspective elevation of an alternative embodiment of the invented collar, in accordance with features of the present present invention.

DETAILED DESCRIPTION OF THE INVENTION

Figure 1:
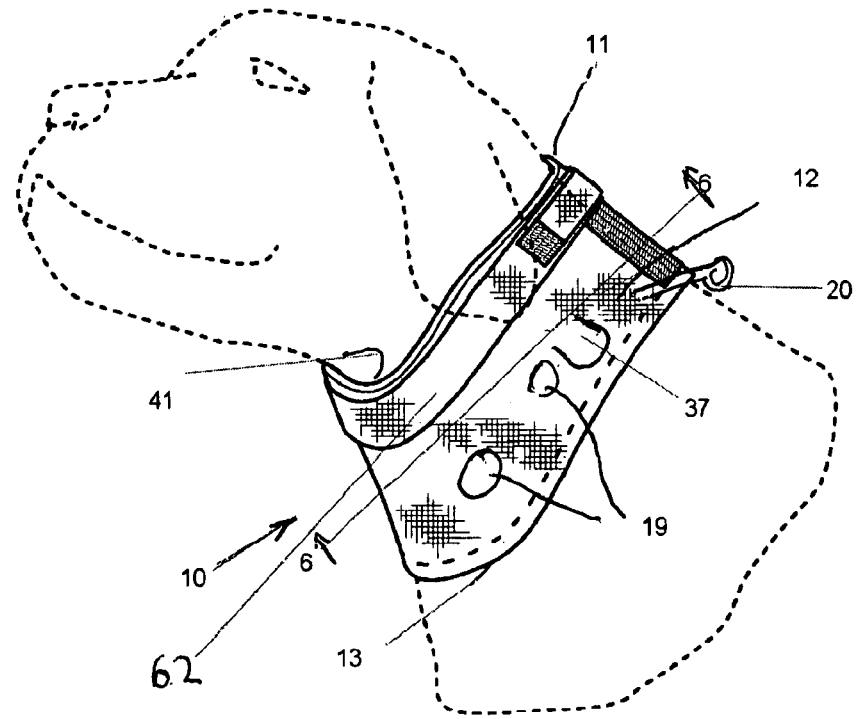
FIG. 1 is a perspective elevation of a collar in an operative position (i.e. deployed configuration) in accordance with features of the present invention.

The present invention provides for a protective collar, generally designated as numeral 10 in FIG. 1. The collar is shown in an operative (deployed) position.

The device is defined by an outer shell 12 comprising an impact-resistant yet non-rigid material such as plastic. The outer shell material also comprises water-resistant material to keep the outershell portion of the collarfree of moisture. Flexible members or supports such as plastic "ribs" 16 (see FIG. 8) may contact the surface of the outer shell to confer rigidity and structural support to the device. These ribs can be embedded into the surface so as to confer a smooth texture to the surface. These supports extend generally parallel to the direction of the animal's spine (i.e. from the occiput to the withers of a dog, thereby immobilizing its neck and crest.) and could be either removably received by the surface, via frictional engagement, snap fit engagement, slidably received by the surface, or else integrally molded therewith. In the alternative, a semi-rigid substrate (such as plastic) may be located intermediate the outer shell and an inner shell.

Passageways 19 for air circulation, medication administration, or to display identification, are provided, whereby the passageways are transverse apertures extending through all layers of the collar to expose a portion of the animal's body residing beneath the collar. Also, regions of the outer layer may define one or more pockets 37 or other means for the storage of medications, identification means, or other supplies.

Figure 3:
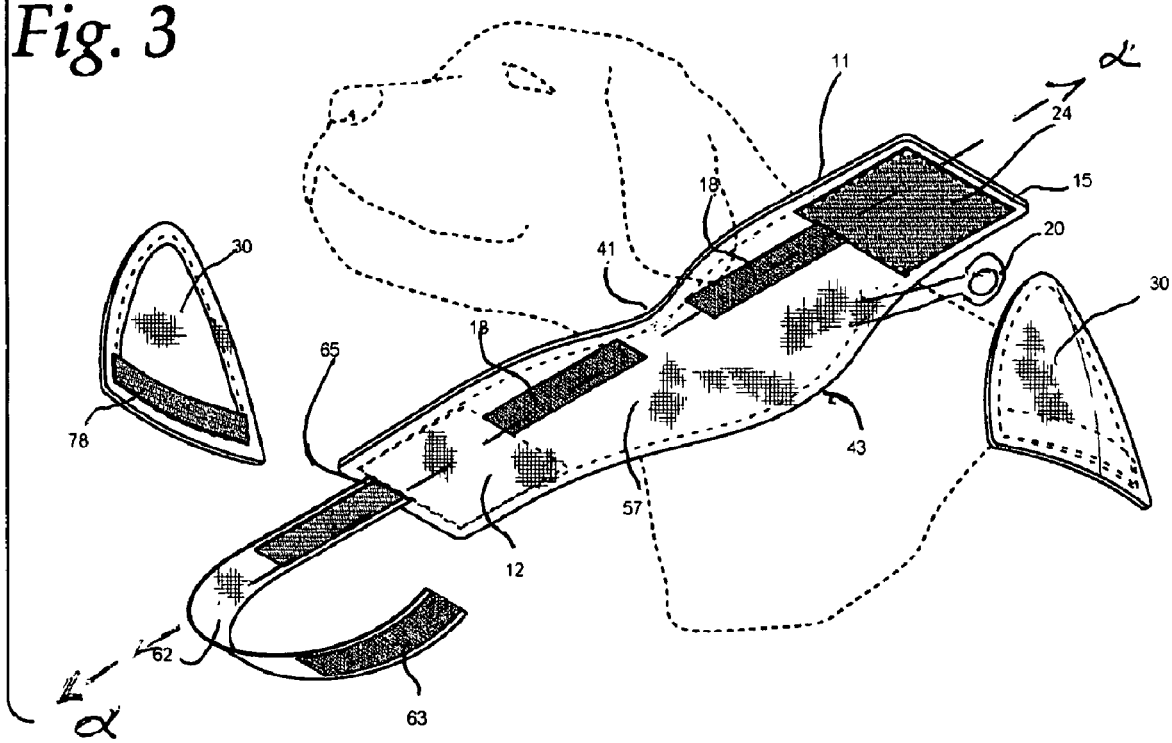
FIG. 3 is a top (outer) plan view of the collar in an undeployed (i.e. open or flat) position in accordance with features of the present invention.
Figure 4:
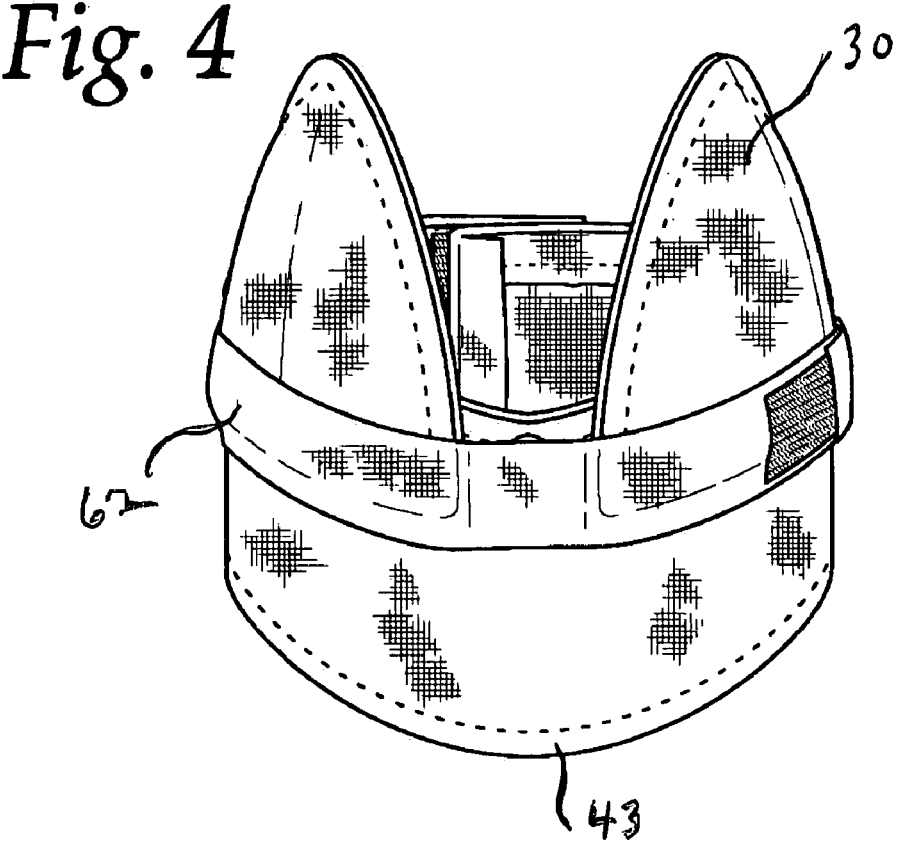
FIG. 4 is a forward view elevation of the collar depicted in FIG. 1 in an operative position (i.e. deployed configuration) in accordance with features of the present invention.

At a forward edge 11 of the collar 10 (i.e., one nearest to the animal's head) the collar defines a medially directed curved region 41 (i.e., directed perpendicularly toward the longitudinal axis .alpha. of the collar, see FIG. 3), such that when the collar is worn, the curved region is in close spatial relationship to the animal's throat to allow the animal to rotate its head from a horizontal orientation to a head down (eyes on the ground) orientation. This feature allows the animal to look down without having to crouch or otherwise move its entire upper body. Similarly, a rearward edge 43 of the collar defines a laterally directed region of the collar or bulge which results in the collar extending downwardly away from the head and toward the upper chest of the animal. This laterally extending edge, whereby the bulge is directed perpendicularly away from the longitudinal axis .alpha. of the collar, confers added stability to the collar.

Also proximal to the edge 11 are located regions defining hook-and-pile connectors (e.g. Velcro.®. strips) 18 (see FIG. 3) to which complementary surfaces of ear guards 30 (see FIG. 2) are attached.

Aside from hook-and-pile connectors, snaps, zippers or other ear guard attachment means can be utilized.

Once attached to the collar, the ear guards 30 are further secured by a peripherally extending strap 62 that encircles an outwardly facing surface of the collar to close the collar about the animal's neck. The strap, so engaged, simultaneously frictionally engages an outward facing surface, proximal region of the ear guards (i.e., near the point of attachment of the ear guards to the collar), such that the proximal region is sandwiched or otherwise positioned intermediate an outwardly facing surface of the collar and the strap. Generally the strap has one free end 63 which terminates with hook-and-pile, snap-, or other closure-means, so as to interact with similar complementary connectors on the outwardly facing surface of the collar. Another end of the strap 65 is not free to adjustably interact with the collar. Rather this end 65 is either removably attached or sown into the collar. In this configuration, the free end of the strap can serve as an impromptu leash or restraining rope, inasmuch as the collar is already provided with primary closure means 24, discussed supra.

Also, one or more highly reflective strips may be included on the outer shell surface 12.

Figure 2:
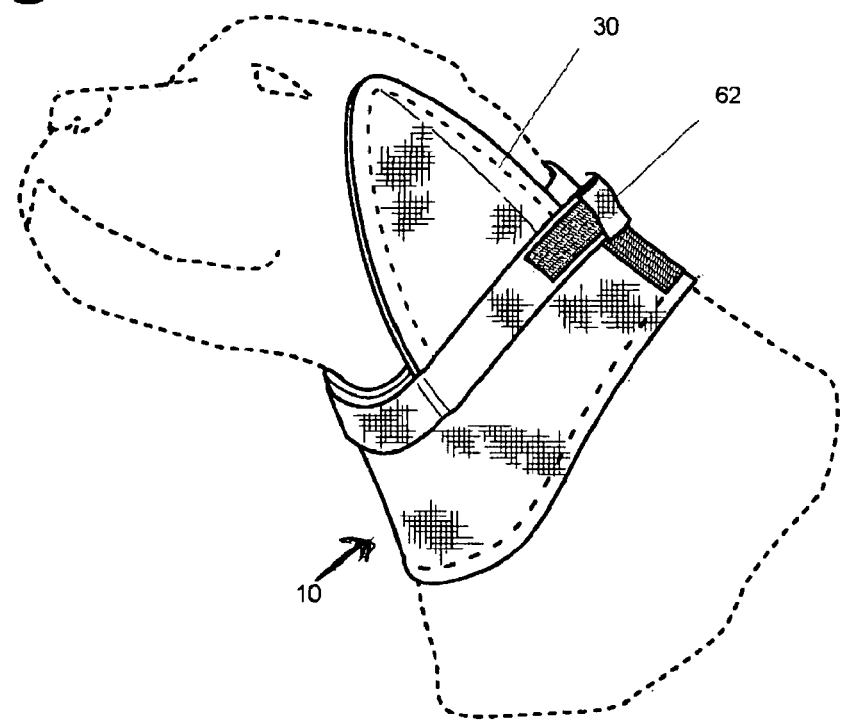
FIG. 2 is a perspective elevation of another embodiment of the collar in an operative position (i.e. deployed configuration) with ear guards attached, in accordance with features of the present invention.

FIG. 2 is a perspective elevation of the invented collar in an operative position (i.e. deployed configuration). This figure shows the ear guards attached to the collar, and the strap 62 encircling the collar to both further secure the ear guards underlaying the strap, and to provide a secondary means to secure the collar in place on the animal.

FIG. 3 shows the collar in a flat (i.e. undeployed) position with the outer layer 57 in view. The outer layer defines an outer shell 12. The collar defines a longitudinal axis .alpha.

A region 24 of hook-and-pile closure (e.g. Velcro.®.) in the shape of a patch, strip, or other configuration is arranged along a transverse edge 15 of the collar to effect closure of the collar to form the configuration depicted in FIG. 1. Also depicted in FIG. 3 is a strip of hook-and-pile closure 63 such as Velcro.®. to effect closure of the strap 62.

Figure 5:
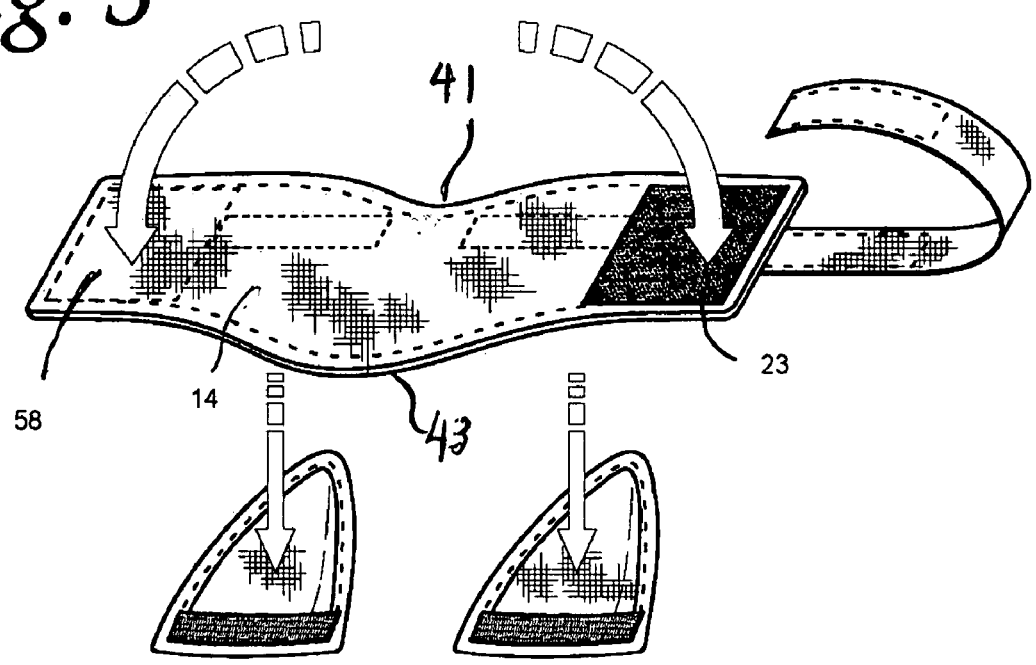
FIG. 5 is a perspective view of the inside of an undeployed collar in an undeployed (i.e. open or flat) position in accordance with features of the present invention.

FIG. 5 shows the collar in a flat (i.e. undeployed) position with the inner layer 58 in view. The inner layer defines an inner shell 14.

Figure 6:
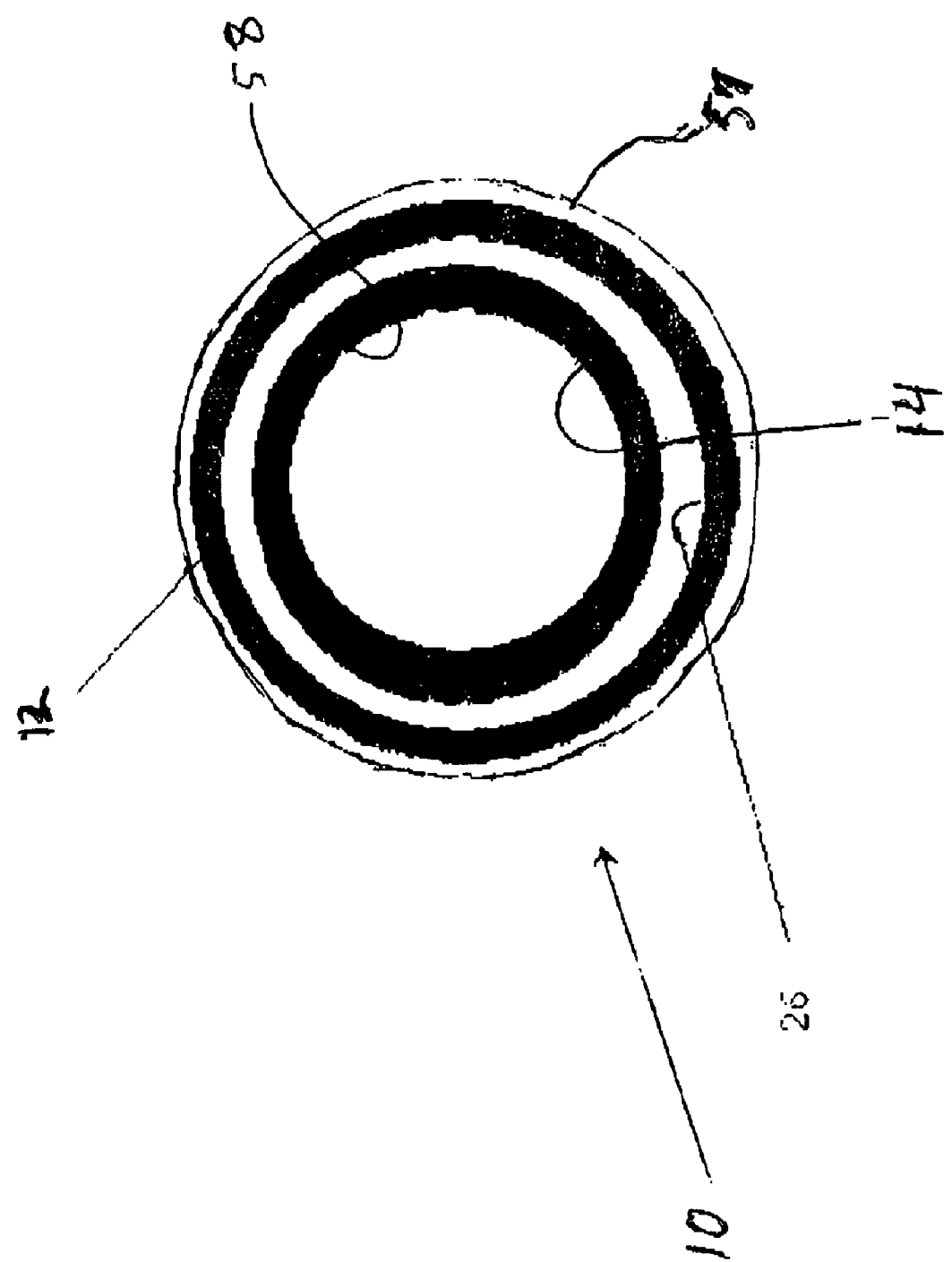
FIG. 6 is a cross-section of the collar in an operative position taken along line 6-6 of FIG. 1 in accordance with features of the present invention.

FIG. 6 is a cross-section of the collar in an operative position taken along line 6-6 of FIG. 1. Intermediate the inner and outer shells is a substrate 26 defining an impact-resistant layer 40 depicted in FIG. 6. The intermediate layer 40 provides a means for substantially rigid structural support for the device. FIG. 9 depicts the intermediate layer separated and detached from the collar. In one embodiment, the layer incorporates flexible plastic webbing in contact with flexible members or "ribs" 16. Intermediate said ribs are located ventilation apertures 19. The ribs are arranged substantially parallel to each other, and extend in the same direction as the animal's spine along the surface defined by the web. The layer 40 may be substantially planar, or frusto-conical or hour-glass or combined frusto-conical and hour-glass in shape when the device is closed to form a collar. (See FIGS. 10a, 10b, and 10c).

The webbing further comprises hook-and-pile connectors 22, such as Velcro.®. configurations to connect with complementary Velcro.®. connectors on the inner shell. These connectors confer the ability to attach or detach the impact-resistant layer from the inner shell depending on need.

Figure 8:
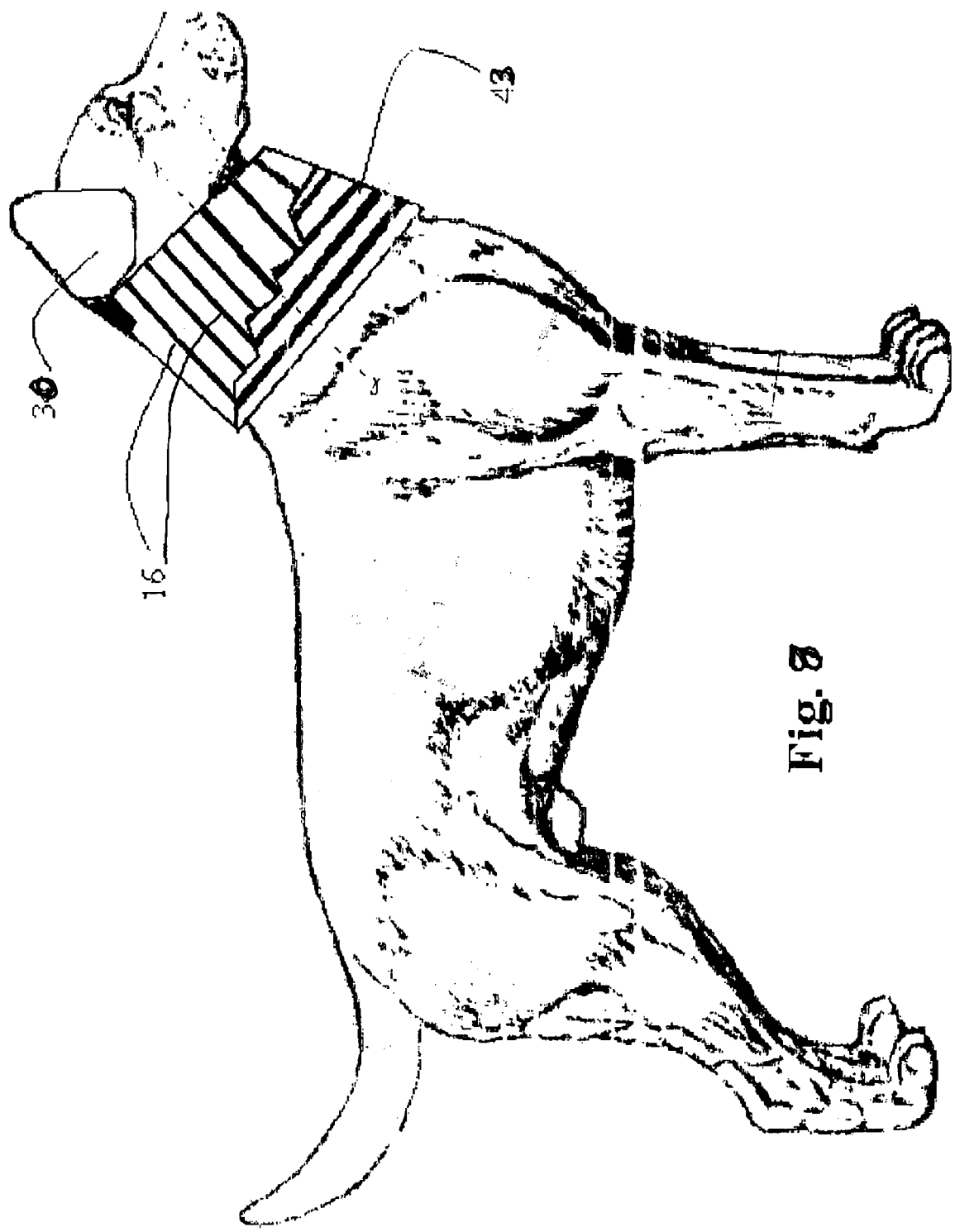
FIG. 8 is a is a perspective elevation of the collar in an operative position (i.e. deployed configuration) with a cutaway showing plastic supports on the outer shell and flexible members of the intermediate layer in accordance with the features of the present invention.

In another embodiment, depicted in FIG. 8, the intermediate layer contains a plurality of elongate arcuate shaped supports 43 arranged parallel to each other. The arcuate supports 43 are further arranged such that the concave surfaces of the arcuate supports face toward the animal's neck when the device is worn so as to be adapted to nest with and receive the complementary convex topography of the animal's neck. In this embodiment, the arcuate-shaped supports may comprise semi-rigid plastic or a reversibly deformable material, such as metal, so as to allow the intermediate layer to be reversibly form-fitted about the periphery of the neck of the animal. As such, the arcuate supports extend in a direction generally perpendicular to that of the animal's spine (See FIG. 8).

In an embodiment of the collar, and as depicted in FIG. 1, a region of the collar defines a leash ring 20 or a means to attach a leash ring to the collar. One such means is an aperture that extends transversely through the outer shell and inner shell to which a leash can be connected. The periphery of the aperture comprises a ring, a grommet, or other such substrate to secure a leash attachment.

To facilitate closure of the collar about the animal's neck, a hook-and-pile closure is envisioned whereby one portion of the closure (i.e., a hook-side surface 23 is present on the inner shell (See FIG. 5). A complementary pile or loop-side layer 23 is present on the outer shell (See FIG. 3). The hook-side and pile-side layer mate to facilitate closure of the collar. The layers can be manipulated to adjust to an animal's specific neck diameter. These closure layers should be wide enough so that the shape of the collar may be varied depending on the characteristics of the animal: the collar may be made to flare out near the head, to assume a cylindrical shape, to flare out at the shoulders, or to converge inwardly at the shoulders (see FIGS. 10a, 10b, and 10c).

FIG. 10a depicts an alternative embodiment of the invented collar. As shown in FIG. 10a, the ribs 16 are spaced closer together at a first end 11 of the device than at the opposite second end 13 so as to define a frusto-conical volume. FIG. 10b depicts another alternative embodiment where the collar assumes an hour-glass shape. FIG. 10c depicts an embodiment whereby the proximal end 13 of the collar curves inwardly toward the surface of the animal, so as to extend in a medial direction toward the axis of the collar so as to assume a combined hour-glass and frusto-conical shape.

Figure 11:
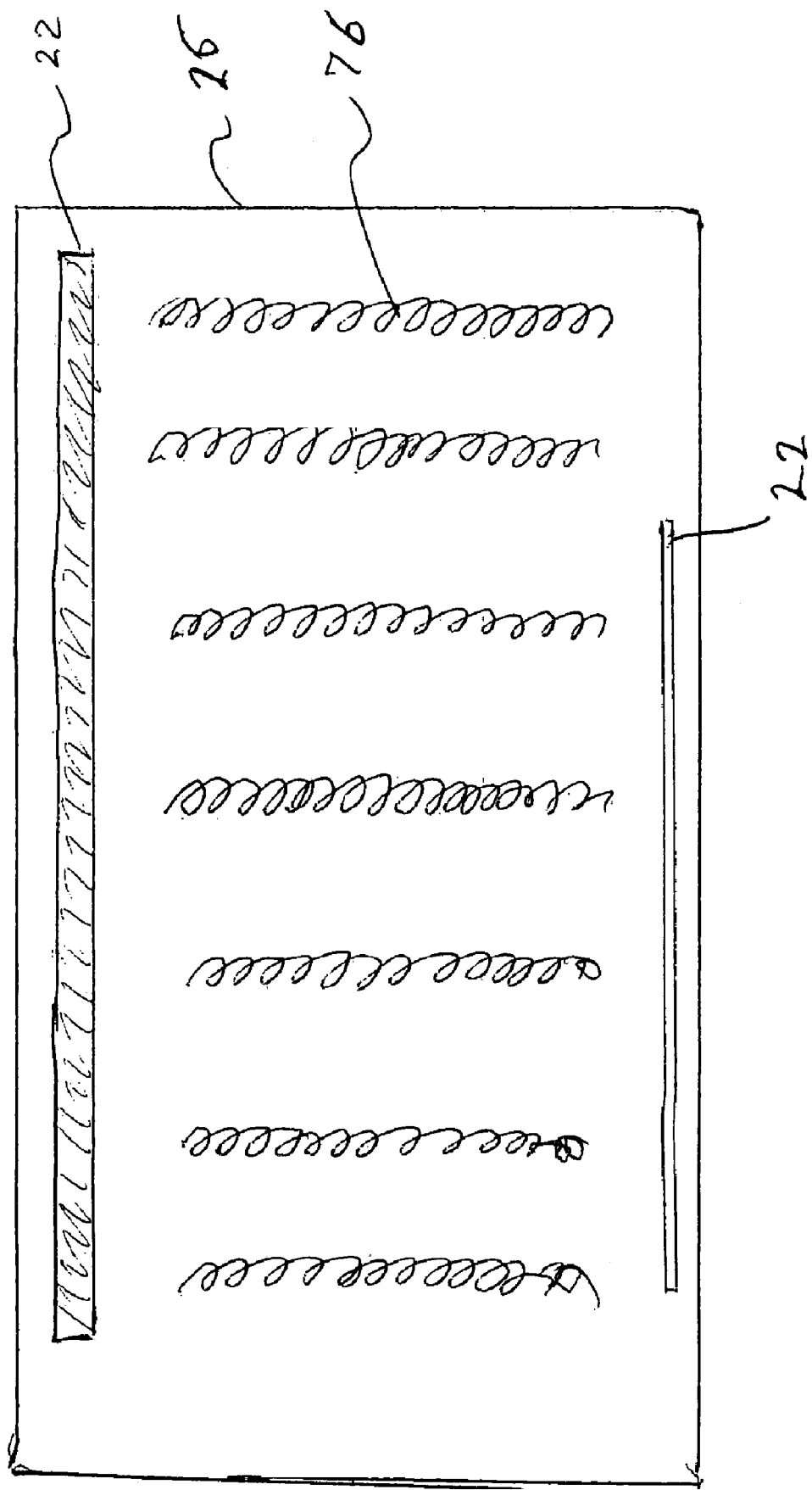
FIG. 11 is a top plan view of another embodiment of an intermediate layer of the collar in an undeployed flat position in accordance with features of the present invention.

FIG. 11 depicts another alternative embodiment of the flexible members in the intermediate layer of the invented collar. As shown in FIG. 11 the ribs 16 are replaced by helical coils 76 extending perpendicular to the hook and pile closure means 22, i.e., in a direction parallel to the animal's spine. In the alternative, helical coils may extend parallel to the closure means 22 (i.e., extending around the animal's neck such that the coils substantially circumscribe the animal's neck when the collar is worn). The coils 76 can be fabricated of wire or of the same flexible plastic materials as the ribs. As with the ribs, the coils are biased to extend in a predetermined direction so as to return back to that predetermined configuration after flection. The coils also provide reversible elongation and compression along their axes.

Attachment points 18 at a distal (i.e., forward facing) edge, and therefore in a close spatial relationship to an animal's occiput, of the outer shell provide a means for connecting protective ear covers or guards to the collar 10 (See FIG. 3). These attachment points may comprise a hook-and-pile assembly wherein a hook-side closure layer is attached to the outer shell while a complementary loop-side layer 78 is positioned at the protective ear cover, or vice versa. In another embodiment, the ear guards may be received by snap-on means. When not in use, the ear covers can be tied, snapped to, or otherwise reversibly attached to the collar so as to be removably stowed on the collar.

Shown in FIG. 2, is a preferred embodiment for the ear guards 30. This ear guard configuration comprises a single rigid shield which serves as a barrier between the ear and any medially directed force. It does not encircle the ear, but rather is positioned in close spatial relationship to the ear.

In another embodiment shown in FIG. 7a, the ear cover 30 is shaped to fit over a pet's ear. In this embodiment, the cover is approximately ellipsoidal in cross-section (See FIG. 7b) so as to be adapted to slidably receive an ear and to encapsulate or encircle substantially the entire ear, extending beyond the distal tip of the ear. The ear covers are defined by an outer shell 34 comprising rigid plastic material. The outer shell material also comprises water-resistant material to keep the exterior of the cover and ear free of moisture. The inner layer defines an inner shell 32. The inner shell comprises of soft material suitable to confer comfort to the animal's ear. Generally, reversibly deformable material is utilized so that the ear guards are removably snapped into position. For example, the inner shell material comprises foam, cotton, fleece fabric, or a fluid resistant cushion, similar to that used for the inner layer of the collar.

The ear covers are provided in a variety of sizes to ensure that a wide range of species of canine and feline ears accommodated. The ear covers have a Velcro.®. strip 38 capable of attachment to a Velcro.®. receiving point on the collar 18. In one embodiment, the ear cover defines a traverse aperture 35 to confer access to the ear canal in instances where dressings must be periodically inspected, for drainage, or where ear drops need to be administered. Optionally, a flap (not shown) occludes the aperture to keep out dust and moisture. As such, the aperture is adapted to receive drainage tubes, ear droppers, etc.

Optionally, a first planar side 33 of the ear guard depicted in FIG. 7 defines a longitudinally-extending slit 36 which extends through all layers of the ear cover defining the first planar side. Opposing edges of the slit 36 comprise complementary closure surfaces, such as a hook-and-pile arrangement, a tongue and groove arrangement, a zipper arrangement, etc. In this embodiment, the ear cover is opened along the slit in a gate-like fashion to facilitate deployment of the cover about the ear of animal by "wrapping" the cover about the ear instead of sliding the cover over the ear.

While the invention has been described in the foregoing specification with reference to the detailed illustrated embodiment, these details are not intended to limit the scope of the invention as defined by the appended claims.

The invention claimed is:

1. A pet protection device comprising:
    an outer shell having a first surface and second surface and a first edge, a second edge, a third edge and a fourth edge, wherein the first edge is opposite the second edge and the third edge is opposite the fourth edge; a longitudinal axis $\alpha$ generally extending from the third edge to the fourth edge;
    an inner shell positioned parallel to and in close spatial relationship to said second surface; and
    a semi-rigid substrate positioned intermediate said outer shell and said inner shell and having a forward edge which includes a curved region directed perpendicularly toward the longitudinal axis $\alpha$ of the device; and wherein said semi-rigid substrate comprises a plurality of flexible members and said flexible members comprise ribs positioned generally parallel to each other, the device further comprising regions between the ribs defining apertures extending transversely through the device.

2. The device as recited in claim 1 wherein the semi-rigid substrate extends from said first edge to said second edge.

3. The device as recited in claim 1 wherein said third edge removably receives said fourth edge to define a collar.

4. The device of claim 1 further comprising the semi-rigid substrate including a rearward edge which includes a bulge which is directed perpendicularly away from the longitudinal axis $\alpha$ of the device.

5. The device recited in claim 4 further comprising a first arcuate member and a second arcuate member, said first and second members received by a region of the outer shell in close spatial relation to said first edge so as to shield the ears of the pet.

6. The device as recited in claim 5 wherein the first and second arcuate members comprise a rigid outer shell and a reversibly deformable inner shell.

7. The device as recited in claim 5 wherein the first and second arcuate members are removably received.

* * * * *